(12) United States Patent
Pickens et al.

(10) Patent No.: US 8,145,778 B2
(45) Date of Patent: Mar. 27, 2012

(54) METHOD AND SYSTEM FOR TRANSITIONING STREAMED DIGITAL VIDEO CONTENT BETWEEN STREAM SERVERS IN A DIGITAL VIDEO NETWORK

(75) Inventors: John Pickens, Newark, CA (US); Hoi-Tauw Chou, San Ramon, CA (US); W. Paul Sherer, Danville, CA (US); Howard Davis, Salem, UT (US); Kevin Kingdon, Hayward, CA (US)

(73) Assignee: Cisco Technology, Inc., San Jose, CA (US)

( * ) Notice: Subject to any disclaimer, the term of this patent is extended or adjusted under 35 U.S.C. 154(b) by 105 days.

(21) Appl. No.: 11/829,059

(22) Filed: Jul. 26, 2007

(65) Prior Publication Data

US 2008/0028093 A1    Jan. 31, 2008

Related U.S. Application Data

(60) Provisional application No. 60/834,229, filed on Jul. 28, 2006.

(51) Int. Cl.
*G06F 15/16* (2006.01)
(52) U.S. Cl. ...................................................... 709/231
(58) Field of Classification Search .................... 709/231
See application file for complete search history.

(56) References Cited

U.S. PATENT DOCUMENTS

| | | | | |
|---|---|---|---|---|
| 5,959,690 A * | 9/1999 | Toebes et al. | ................. | 348/578 |
| 6,459,689 B1 * | 10/2002 | Czaja et al. | ................... | 370/331 |
| 6,876,639 B1 * | 4/2005 | Cao | ................. | 370/331 |
| 6,910,078 B1 * | 6/2005 | Raman et al. | ................. | 709/231 |
| 6,996,618 B2 * | 2/2006 | Apostolopoulos et al. | ... | 709/227 |
| 7,139,813 B1 * | 11/2006 | Wallenius | ..................... | 709/219 |
| 7,302,490 B1 * | 11/2007 | Gupta et al. | ................. | 709/231 |
| 2002/0064273 A1 * | 5/2002 | Tomikawa et al. | ........ | 379/221.02 |
| 2003/0007515 A1 * | 1/2003 | Apostolopoulos et al. | ... | 370/503 |
| 2003/0009577 A1 * | 1/2003 | Apostolopoulos et al. | ... | 709/231 |
| 2006/0146780 A1 * | 7/2006 | Paves | ........................... | 370/348 |
| 2007/0022207 A1 * | 1/2007 | Millington | .................... | 709/231 |
| 2007/0107026 A1 * | 5/2007 | Sherer et al. | .................... | 725/97 |
| 2007/0254659 A1 * | 11/2007 | Paul et al. | ..................... | 455/436 |
| 2008/0065724 A1 * | 3/2008 | Seed et al. | ..................... | 709/203 |

\* cited by examiner

*Primary Examiner* — Ryan Jakovac
(74) *Attorney, Agent, or Firm* — Merchant & Gould

(57) ABSTRACT

A technique for transitioning streamed digital video content between stream servers involves identifying a transition identifier that indicates a point at which streaming of the digital video content transitions from a first stream server to a second stream server and then transitioning the streaming from the first stream server the second stream server at a point in the digital video content that corresponds to the transition identifier. For example, the first stream server stops streaming the digital video content at a point in the digital video content that corresponds to the transition identifier and the second stream server starts streaming the digital video content at a point in the digital video content that corresponds to the transition identifier.

20 Claims, 7 Drawing Sheets

METHOD AND SYSTEM FOR TRANSITIONING STREAMED DIGITAL VIDEO CONTENT BETWEEN STREAM SERVERS IN A DIGITAL VIDEO NETWORK

CROSS-REFERENCE TO RELATED APPLICATIONS

This application is entitled to the benefit of provisional U.S. Patent Application Ser. No. 60/834,229, filed Jul. 28, 2006, the disclosure of which is incorporated by reference herein in its entirety.

FIELD OF THE INVENTION

The invention relates generally to digital video networks, and more particularly, to techniques for transitioning streamed digital video content between stream servers in a digital video network that is capable of distributing digital video content via multicasting and unicasting.

BACKGROUND OF THE INVENTION

Digital video content can now be streamed to multiple clients in real-time over traditional cable television and telephone networks, both of which are being leveraged by service providers to provide more attractive and varied services to customers. The streaming of digital video content to clients is supported by a stream server. A stream server delivers digital video content to a client via multicasting or unicasting, where multicasting is used to distribute the same content to multiple clients concurrently and unicasting is used to provide specific content to a particular client. The clients receive streams of digital video content via multicasting or unicasting and playout the digital video content to a device such as a television.

Most streaming networks include multiple stream servers and the load of streams to the clients is distributed among the stream servers. Various operating conditions within the network (e.g., resource failures and subscriber use patterns) cause the load on each stream server to continuously change. Further, it often necessary to take a stream server out of service for maintenance, upgrades, etc. In conventional streaming networks, once a stream is set up on a particular stream server, the stream is committed to that stream server for the life of the stream session. In order to take a stream server out of service, all active streams must run to completion or the streams must be prematurely terminated. Requiring all active streams to run to completion or be prematurely terminated before a stream server can be taken out of service makes it difficult to create windows for stream server maintenance.

In view of this, what is needed is a technique for streaming digital video content to a client that enables active streams to be transitioned between stream servers.

SUMMARY OF THE INVENTION

A technique for transitioning streamed digital video content between stream servers involves identifying a transition identifier that indicates a point at which streaming of the digital video content transitions from a first stream server to a second stream server and then transitioning the streaming from the first stream server to the second stream server at a point in the digital video content that corresponds to the transition identifier. For example, the first stream server stops streaming the digital video content at a point in the digital video content that corresponds to the transition identifier and the second stream server starts streaming the digital video content at a point in the digital video content that corresponds to the transition identifier. In an embodiment, the first stream server stops streaming the digital video content at a particular frame in a sequence of frames and the second stream server starts streaming the digital video content at the next frame in the sequence of frames. Because the transition between the first and second stream servers is accomplished based on a transition identifier, the transition can be accomplished without redundant streaming of the digital video content and without disruption of service to the subscriber.

A method for transitioning streamed digital video content between stream servers involves streaming digital video content to a client via a first stream server, identifying a second stream server that is to supersede the streaming of the digital video content to the client, identifying a transition identifier that indicates a point at which streaming of the digital video content transitions from the first stream server to the second stream server, and streaming the digital video content to the client via the second stream server starting at a point that is determined in response to the transition identifier.

A system for transitioning streamed digital video content between stream servers includes a stream control module configured to identify a second stream server that is to supersede, from a first stream server, the streaming of digital video content to a client and initiate transition of streaming the digital video content from the first stream server to the second stream server, wherein the transition between stream servers occurs at a point in the digital video content that is identified via a transition identifier.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

Figure 1A:
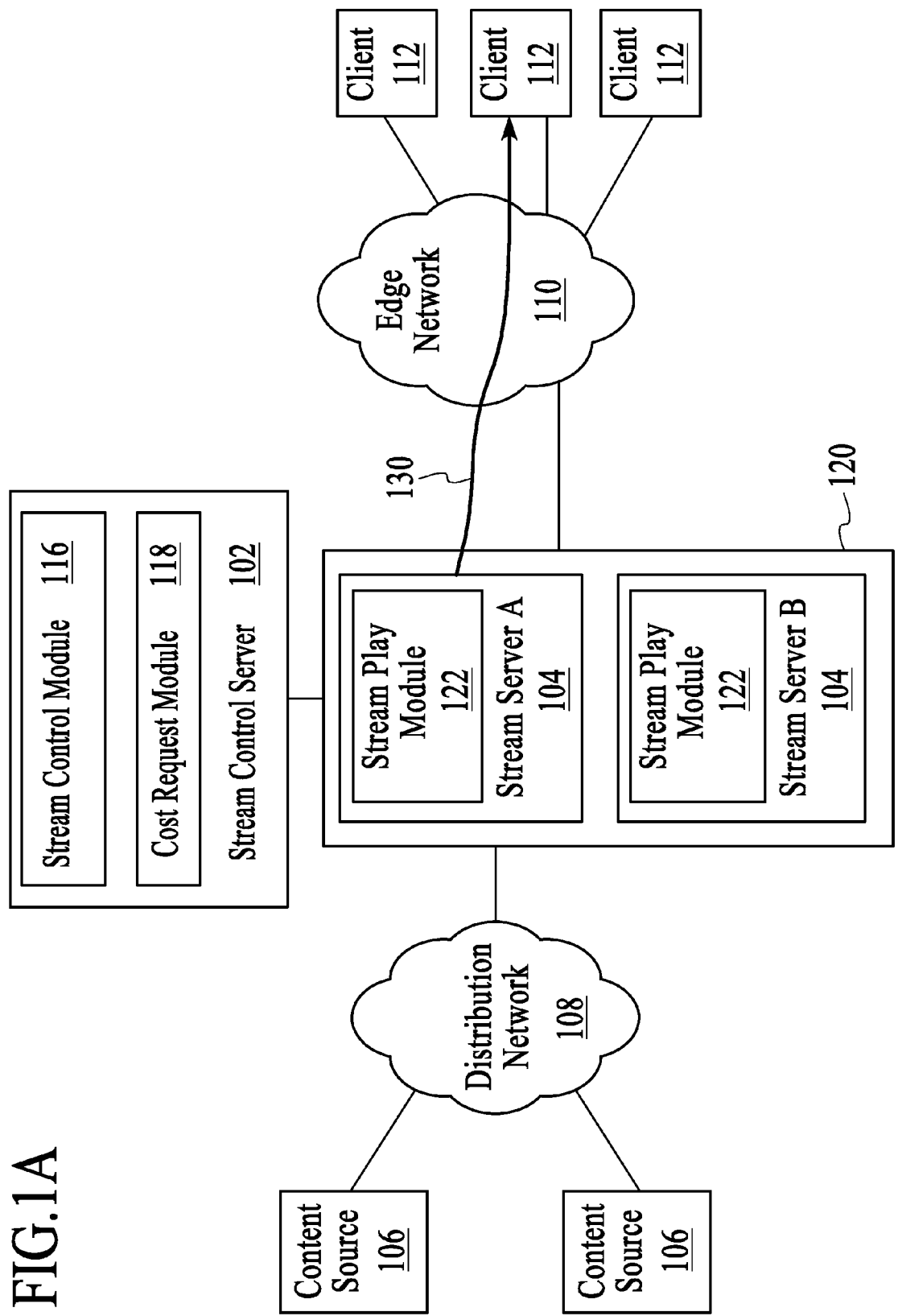
FIGS. 1A-1C illustrate the transition of streamed digital video content between two stream servers in a streaming network.

FIG. 1 depicts a network 100 that includes a stream control server 105 and at least two stream servers 104 that are configured to support the transition of streamed digital video content between the stream servers. The network depicted in FIG. 1 is capable of streaming digital video content to clients via multicasting and unicasting and includes at least one content source 106, a distribution network 108, the stream control server, the two stream servers, an edge network 110, and multiple clients 112. The content sources provide digital video content to the stream servers via the distribution network. In an embodiment, the digital video content is real-time digital video content that is received at a content source and passed to the stream servers with little or no delay. For example, the digital video content includes real-time content from content producers and/or distributors. The digital video content may include, for example, live content (e.g., live sporting events, news, etc.) or pre-recorded content that is released by the content producers and/or distributors. In another embodiment, the digital video content may include content that is played over and over in a repeating loop. In still another embodiment, the digital video content may be stored by the content source, the stream servers, a dedicated storage server, or within the distribution or edge networks. Whether the digital video content is real-time or stored, the digital video content is available to the stream servers for distribution to the clients.

The distribution network 108 can be any type of network that is able to connect the content sources 106 to the stream servers 104. Exemplary network technologies that may be utilized in the distribution network include, but are not limited to, IP, Ethernet, ATM, synchronous optical network (SONET), wavelength division multiplexed (WDM), wide area network (WAN), and local area network (LAN).

The stream control server 102 includes a stream control module 116 and a cost request module 118. The stream control module controls and tracks the states of all streams within a logical group 120 of stream servers, for example, a logical group of stream servers that includes at least stream servers A and B. As is described below, the stream control module is also involved in transitioning a stream between stream servers. The cost request module generates a cost associated with serving a stream. The cost request module can use various different techniques to generate a cost associated with serving a stream. The cost associated with serving a stream is used by the stream control module as described below to transition a stream between stream servers.

The stream servers 104 provide digital video content simultaneously to multiple clients 112 via multicasting (e.g., a multicast stream) and provide digital video content to a particular single client via unicasting (e.g., a unicast stream). The stream servers include a stream play module 122 that controls the streaming of digital video content to the clients. The function of the stream play module is described in more detail below. Although the stream servers are depicted as separate physical entities for description purposes, the stream servers may be implemented within a single physical server or across multiple physical servers that act collectively to stream digital video content to the clients. Although the stream control module 116, cost request module 118, and stream play modules 122 are located within separate servers for description purposes, these modules can be collocated in the same server or distributed over a combination of servers. Further, although only two stream servers are shown, the streaming network may include more than two stream servers.

The edge network 110 includes any type of edge network. Exemplary edge networks include telecommunications networks, such as those which have traditionally been used to provide residential telephone service and are now used to provide video, voice, and data communications and cable networks, such as those which have traditionally been used to deliver residential cable television and are now used to provide video, voice, and data communications. The edge network supports the multicasting and unicasting of digital video content downstream to the clients 112. The edge network also supports upstream messaging from the clients to the stream servers 104. The edge network may utilize any network technology that supports multicasting and unicasting. In a packet-based environment, the edge network may utilize, for example, routers, switches, DSLAMs, passive optical network (PON) architectures, or any combination thereof. In an HFC environment, the edge network may utilize, for example, a combination of routers, switches, and QAMs.

The clients 112 are systems that receive the digital video content from the edge network 110 and playout the digital video content to devices such as video display devices (e.g., televisions). The clients may be embodied as hardware, firmware, software, or any combination thereof and are sometimes referred to as set-top boxes (STBs). Clients that are able to receive and playout digital video content may also be incorporated into devices such as televisions and computers. Clients in general are well-known in the field.

In accordance with an embodiment of the invention, a technique for transitioning streamed digital video content between stream servers involves streaming digital video content to a client via a first stream server, identifying a second stream server that is to supersede the streaming of digital video content to the client, identifying a transition identifier that indicates a point at which streaming of the digital video content should be transitioned from the first stream server to the second stream server and then transitioning the streaming from the first stream server to the second stream server at a point in the digital video content that corresponds to the transition identifier. For example, the first stream server stops streaming digital video content to a client at a point in the digital video content that corresponds to the transition identifier and the second stream server immediately starts streaming the digital video content at a point in the digital video content that corresponds to the transition identifier.

The techniques described herein enable dynamic load balancing between stream servers, the flexible creation of maintenance windows, and stream failover protection. Further, the above-described techniques enable streamed digital video content to be transitioned between stream servers without redundant transmission of the same digital video content and without creating gaps (e.g., skipped frames) in the streamed digital video content. Further, the above-described techniques enable higher value streams to be provided the best quality transition while lower value streams receive lower quality transitions (e.g. a brief pause) if the available system resources are insufficient to maintain the highest quality transition (no visible delays or artifacts). Any attribute based valuation mechanism can be used to assign value to streams, such as popularity, resource impact, or random assignment.

Figure 1B:
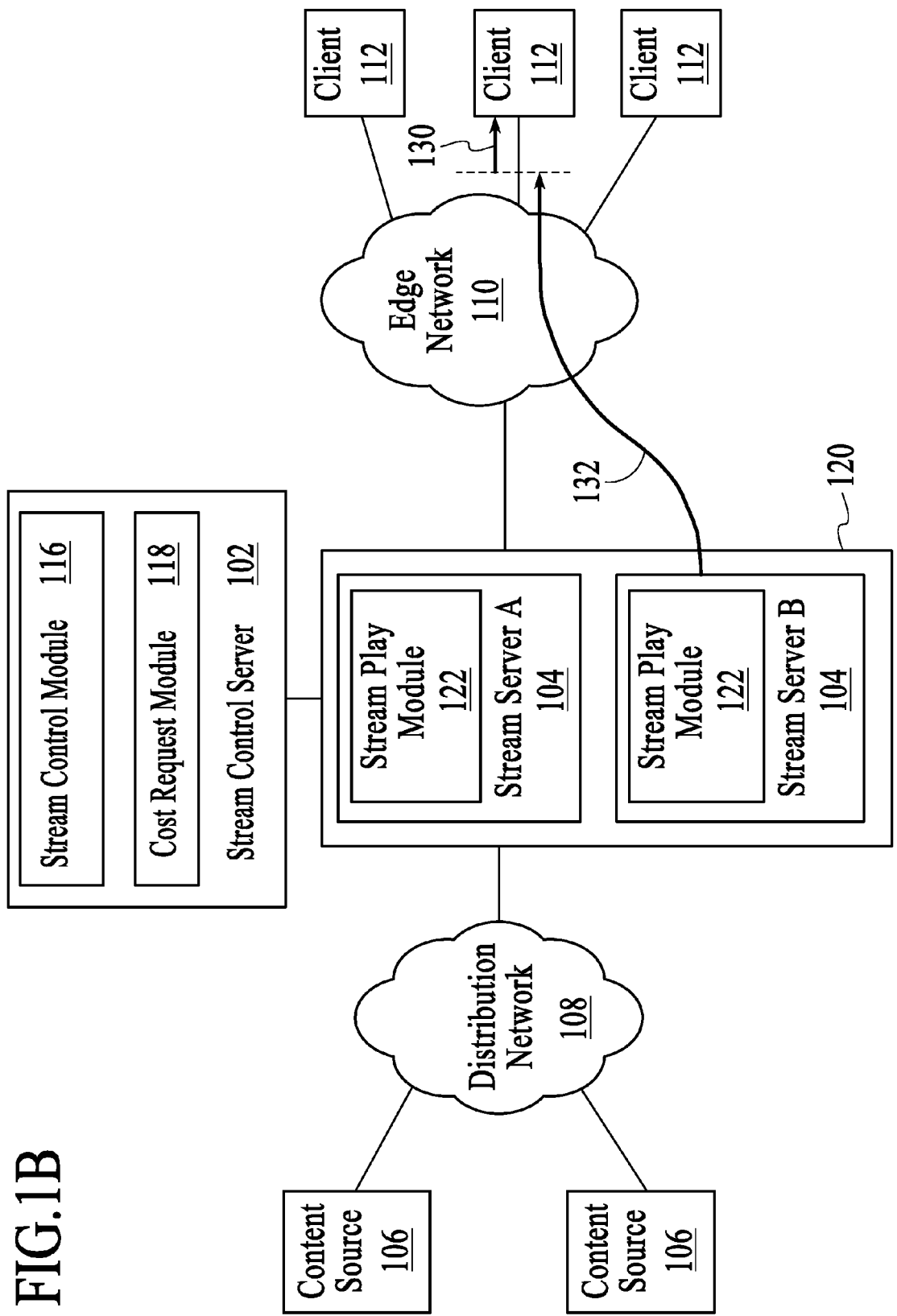
Figure 1C:
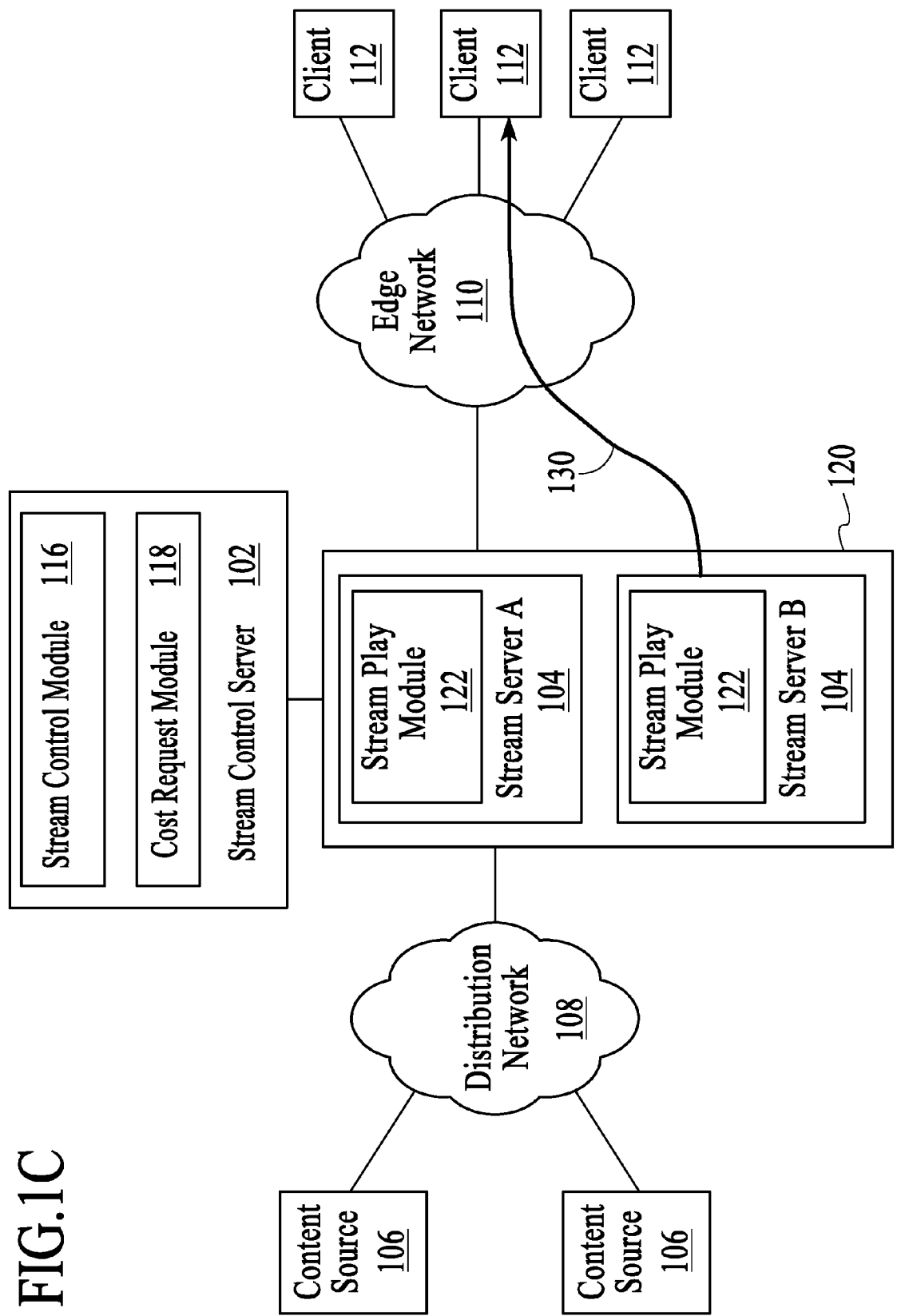

A broad example of the above-described technique is described with reference to FIGS. 1A-1C. FIG. 1A illustrates digital video content 130 being streamed to a client 112 via stream server A. At some point, it is decided that stream server B should supersede the streaming of the digital video content to the client. FIG. 1B illustrates the end of the digital video content 130 that is streamed to the client from stream server A relative to the beginning of the digital video content 132 that is streamed to the client from stream server B. In an embodiment that is described below with reference to FIG. 2, the digital video content from stream server B starts at the next frame after the last frame of digital video content from stream server A. FIG. 1C illustrates the digital video content being streamed to the client from stream server B after the transition from stream server A to stream server B has been completed.

Figure 2:
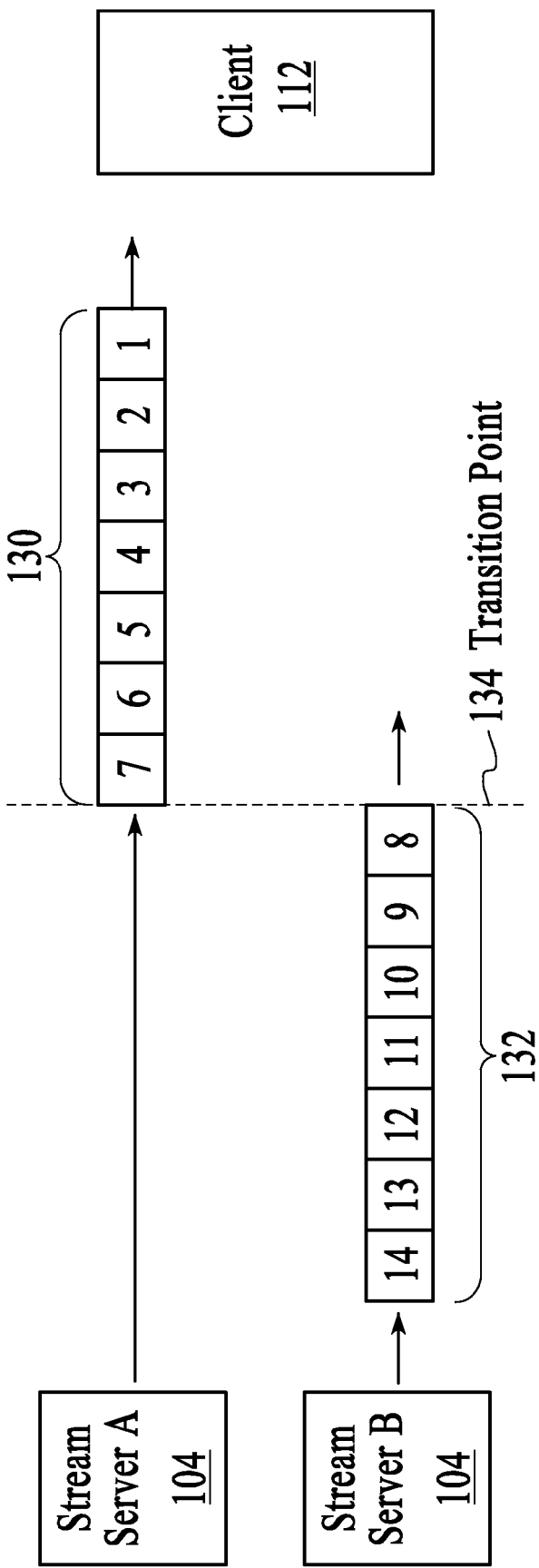
FIG. 2 illustrates an embodiment of the transition of streamed digital video content between stream server A and stream server B from FIGS. 1A-1C in the case where no redundant frames are streamed and no service disruption is experienced.

In an embodiment, stream server A stops streaming the digital video content at a particular frame in a sequence of frames and stream server B starts streaming the digital video content at the next frame in the sequence of frames. The point at which the first stream server stops streaming and the second stream server starts streaming corresponds to the transition identifier. FIG. 2 illustrates an embodiment of the transition of streamed digital video content between stream server A and stream server B in the case where no redundant frames are streamed and no service disruption is experienced. As depicted in FIG. 2, the digital video content is made up of a sequence of frames (e.g., a sequence of MPEG encoded I, B, and P frames). For description purposes, the sequence of frames is numbered from 1-14. In the example of FIG. 2, stream server A streams frames 1-7 of the digital video content 130 to the client 112 and stream server B streams frames 8-14 of the digital video content 132 to the client. The transition point 134 in the digital video content corresponds to the transition identifier and occurs between frames 7 and 8. Because the transition between the first and second stream servers is accomplished based on the transition identifier, the transition can be accomplished without redundant streaming of the digital video content. Additionally, the transition from stream server A to stream server B is timed such that the delay between streams is transparent to the client, e.g., it causes no disruption in the playout of the digital video content at the client. In some applications, the transition between stream servers may result in an interruption of the stream on the order of tens of milliseconds or less. However, clients are typically able to handle such short interruptions without generating artifacts.

Just how the transition identifier is used to support a transition between stream servers and how the transition is accomplished without a service disruption is implementation specific. Exemplary embodiments of techniques for transitioning a stream of digital video content between stream servers are described below with reference to FIGS. 3 and 4.

EXAMPLE 1

Bounded Time Handoff

A first technique for transitioning a stream of digital video content between stream servers is described with reference to FIG. 3. This technique is applicable to situations where the maximum delay for activating a stream is known. That is, this technique is applicable when the time required for stream server B to provide streamed digital video content to a client is known with relative certainty, e.g., within 10-1,000 milliseconds. The technique involves communicating various messages between the stream control server and the two stream servers to accomplish a smooth and timely transition between the stream servers. Message names and corresponding message functions used in this technique are as follows:

supersedingStopPlay—initiate the process of stopping the streaming of digital video content within the stream server that receives the message;

supersedingPlay—initiate the process of readying the stream of digital video content for subsequent play;

playComplete—signal that the active stream is no longer being streamed;

readyToPlay—indicate that the server is ready to stream the digital video content:

playWillComplete—acknowledge that a request to stop streaming has been received and the process of stopping a stream has begun; and startPlay—immediately start streaming digital video content.

Figure 3:
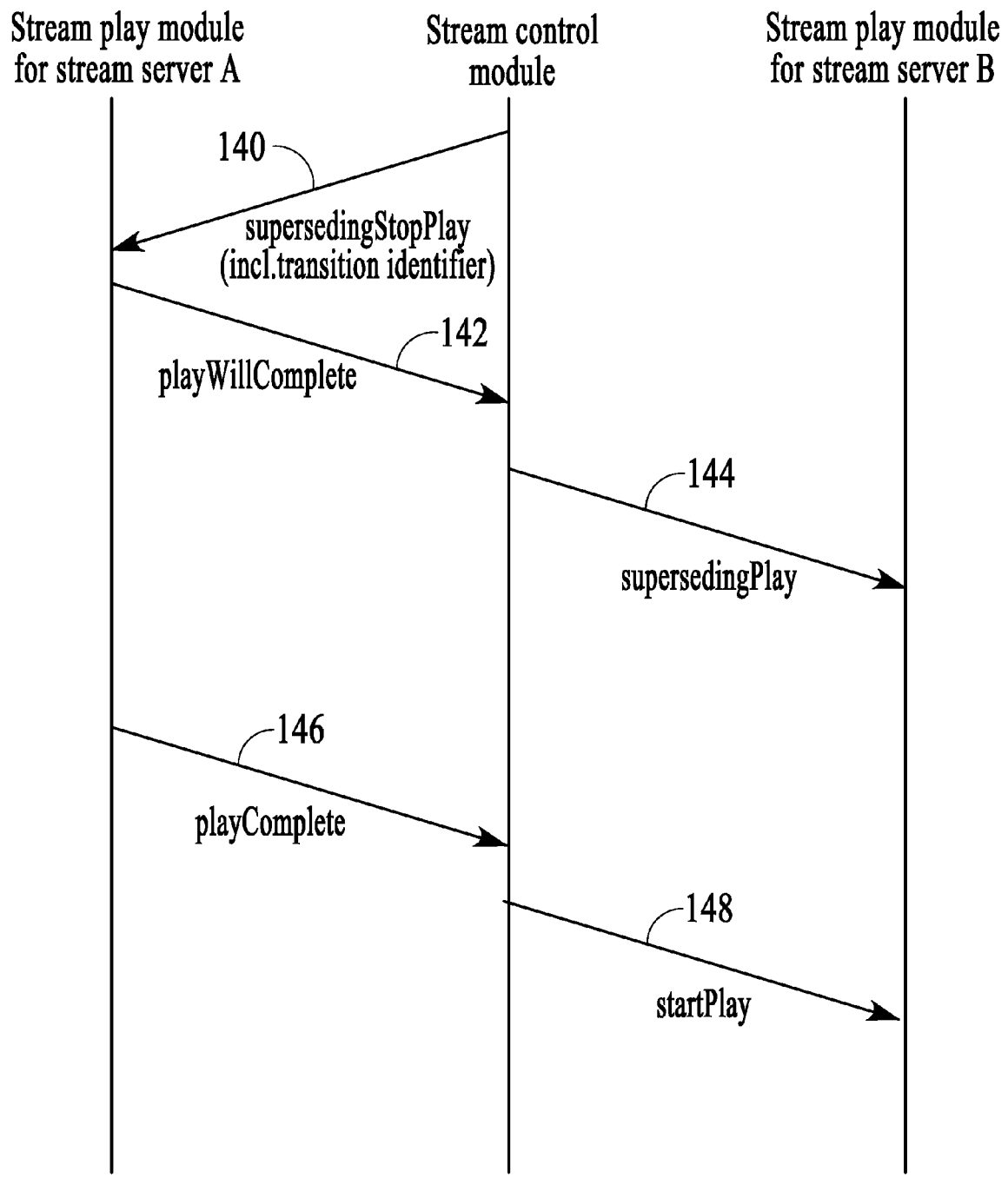
FIG. 3 is a message timeline that illustrates a first technique for transitioning a stream of digital video content between stream servers.

With reference to the messaging timeline of FIG. 3 and according to the first technique, the stream control module sends a supersedingStopPlay message 140 to the stream play module of stream server A, where stream server A is assumed to be actively streaming digital video content to the client. The supersedingStopPlay message includes a transition identifier that indicates a point at which streaming of the digital video content should transition from stream server A to stream server B. In an embodiment, the transition identifier is determined as a function of the time required for stream server B to begin active streaming to the client. In an embodiment, the transition identifier includes a parameter that denotes a deterministic offset relative to a specific I, B or P-frame contained within the stream (e.g. byte or frame offset). For example, the length of the offset is computed to be at least as long as the longest delay anticipated for initiation of streaming in the superseding server. This delay can be lower for higher priority streams, and higher for lower priority streams. In another embodiment, the transition identifier identifies a time identifier, which may be an absolute or relative time identifier.

In response to the supersedingStopPlay message, the stream play module 122 of stream server A generates a playWillComplete message 142 and communicates this message to the stream control module of the stream control server. The playWillComplete message acknowledges the request to stop streaming the digital video content.

Sometime before, during, or after the supersedingStopPlay message is sent to stream server A, the cost request module 118 is invoked to generate a cost of servicing the stream. Various different techniques can be used to generate a cost for the stream that is to be transitioned. In one embodiment, a cost is calculated using a simple round robin algorithm with little or no knowledge of internal server state beyond "up" or "down". In another embodiment, a cost is generated using an algorithm that maintains state awareness of each stream server. State variables that are considered when generating the cost may include, for example, server load (e.g., stream count, I/O congestion of disk and NIC interfaces, etc) and/or cache presence for the streaming content to be delivered. Other techniques for generating a cost may be utilized. Once the cost is generated, the stream server, which is to supersede the streaming of the digital video content to the client, is identified. In an embodiment, the stream server is identified by the stream control module in response to the cost provided from the cost request module.

After a superseding stream server is identified and after the playWillComplete message is received from stream server A, the stream control module 116 generates a supersedingPlay message 144 and provides the message to the stream play module of the identified stream server, e.g., stream server B, also referred to as the "superseding" stream server. The supersedingPlay message causes stream server B to get the stream of digital video content ready to stream. In particular, the supersedingPlay message causes stream server B to perform all steps necessary to ready the digital video content for streaming. In an embodiment, readying the stream server involves bringing the digital video content into memory if it is not already present on external storage, or bringing the initial portion of the digital video content into the stream server from another server if it is not already present in memory or external storage. The amount of time required to get the stream server ready to stream the digital video content can vary from effectively zero to the order of a second in typical implementations. In an embodiment, the supersedingPlay message includes a stream identifier that identifies the stream of digital video content that is to be streamed by the superseding stream server. The stream identifier may be used to access a shared database of content identifiers. In an embodiment, stream identifiers are globally unique. In another embodiment, digital video content can be explicitly identified by a content identifier.

When stream server A stops streaming the digital video content, it generates a playComplete message 146 and sends the message to the stream control module. The playComplete message indicates that the stream is no longer being streamed by stream server A. In response to the playComplete message, the stream control module generates a startPlay message 148 and sends the startPlay message to the stream play module of stream server B. The startPlay message indicates that stream server B should immediately start streaming the digital video content at a point in the digital video content that corresponds to the transition identifier. Once stream server B starts streaming the digital video content, the transition from stream server A to stream server B is complete.

EXAMPLE

Unbounded-Time Handoff

A second technique for transitioning between stream servers is described with reference to the messaging timeline of FIG. 4. This technique is applicable to situations where the delay for activating a stream at the superseding stream server is unknown. That is, this technique is applicable when the time required for a superseding stream server (i.e., stream server B) to provide streamed digital video content to a client is not known with enough certainty to allow the active stream server (i.e., stream server A) to unilaterally stop streaming digital video content without some input from the superseding stream server. This technique can also reduce signaling latency in the case that the stream control module 116 is located in a server that is not the same server as either the active stream server or the superseding stream server. As with the technique of FIG. 3, this technique involves communicating various messages between the stream control server and the two stream servers. Message names and corresponding message functions used in this technique are similar to those described above with reference to FIG. 3 with certain differences being identified below.

Figure 4:
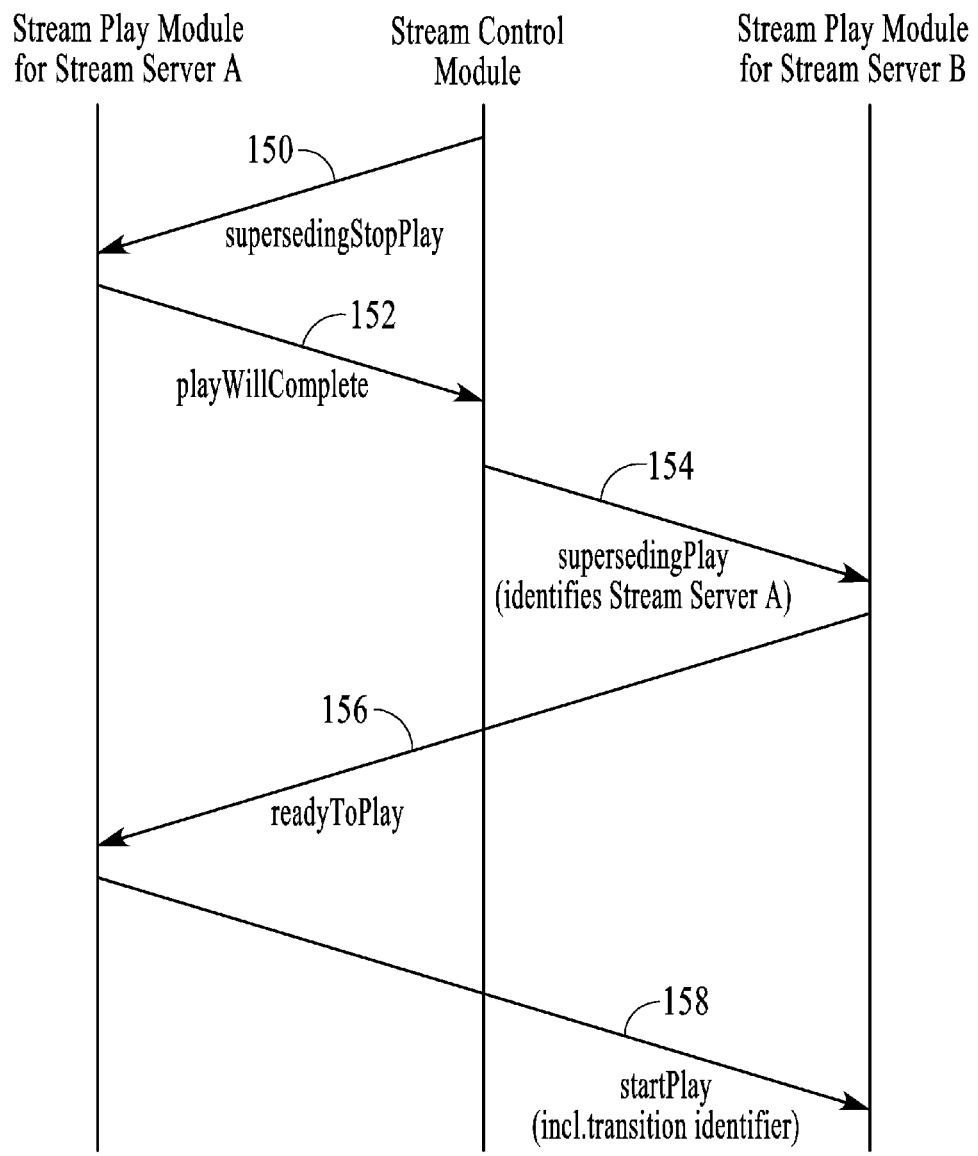
FIG. 4 is a message timeline that illustrates a second technique for transitioning a stream of digital video content between stream servers.

With reference to FIG. 4, the stream control module sends a supersedingStopPlay message 150 to the stream play module of stream server A, where stream server A is assumed to be actively streaming digital video content to the client. In this case, the supersedingStopPlay message does not include a transition identifier that indicates a point at which streaming of the digital video content should transition from stream server A to stream server B.

Sometime before, during, or after the supersedingStopPlay message is provided to stream server A, the cost request module 118 is invoked to generate a cost of servicing the stream. Again, various different techniques can be used to generate a cost for the stream that is to be transitioned. In one embodiment, a cost is calculated using a simple round robin algorithm with little or no knowledge of internal server state beyond "up" or "down". In another embodiment, a cost is generated using an algorithm that maintains state awareness of each stream server. State variables that are considered when generating the cost may include, for example, server load (e.g., stream count, I/O congestion of disk and NIC interfaces, etc) and/or cache presence for the streaming content to be delivered. Other techniques for generating a cost may be utilized. Once the cost is generated, the stream server, which is to supersede the streaming of the digital video content to the client, is identified. In an embodiment, the superseding stream server is identified by the stream control module in response to the cost provided from the cost request module.

If the superseding stream server has been selected before the supersedingStopPlay message 150 is sent to stream server A, then the supersedingStopPlay message includes an identification of the superseding stream server. If the superseding stream server is identified after the supersedingStopPlay message is sent to stream server A, then the supersedingStopPlay message has a null value for the superseding stream server and once the superseding stream server has been identified, a subsequent supersedingStopPlay message is sent to communicate the stream server's identity.

In response to the supersedingStopPlay message, the stream play module 122 of stream server A generates a playWillComplete message 152 and communicates this message to the stream control module 116 of the stream control server. The playWillComplete message acknowledges the request to stop streaming the digital video content.

After the superseding stream server is identified and after the playWillComplete message is sent from stream server A, the stream control module generates a supersedingPlay message 154 and provides the message to the stream play module 122 of the superseding stream server, e.g., stream server B. The supersedingPlay message identifies stream server A as the active stream server, identifies the digital video content that is to be streamed (e.g., through a content identifier of a stream identifier that is used to reference a shared database, and causes stream server B to get the digital video content ready to stream. In particular, the supersedingPlay message causes stream server B to perform all steps necessary to ready the server for streaming. In an embodiment, readying the stream server involves bringing the digital video content into memory if it is not already present on external storage, or bringing the initial portion of the digital video content into the stream server from another server if it is not already present in memory or external storage. The amount of time required to make the stream server ready to stream the digital video content can vary from zero to the order of a second in typical implementations.

When stream server B is ready to initiate streaming, it sends a readyToPlay message 156 directly to the stream play module 122 of stream server A. Upon receiving the readyToPlay message from stream server B, stream server A stops streaming the digital video content and sends a startPlay message 158 to stream server B. The startPlay message contains a transition identifier that indicates the point at which streaming of the digital video content should transition from stream server A to stream server B. In an embodiment, the transition identifier indicates the last frame of digital video content that was sent from stream server A. In an embodiment, the transition identifier includes a structural offset (e.g., I, P, or B-frame demarcation) that is to be used by the superseding stream server to determine where to start streaming. In an alternative embodiment, the transition identifier indicates the first frame that is to be streamed by the superseding stream server.

When stream server B receives the startPlay message, it immediately starts streaming the digital video content at a point that corresponds to the transition identifier. For example, stream server B starts streaming at the structural offset identified by the transition identifier. Once stream server B starts streaming the digital video content, the transition from stream server A to stream server B is complete.

In one embodiment, the startPlay message 158 is also sent to the stream control module 116 in order to update the state machine for the stream. In another embodiment, the stream control module polls the stream servers to detect stream state. No constraint is imposed as to how the stream control module learns the state of the active and superseding stream servers for the stream.

In another embodiment, no restriction is made as to delays that can be added or removed in the timing of sending the readyToPlay message 156. For example, the superseding stream server can delay the sending of the readyToPlay message until higher priority streams are first processed. In another embodiment, in a resource constrained case, the superseding stream server can send a readyToPlay message before it is ready to stream the digital video content and if the stream is still not yet ready after receiving a startPlay message, it can stream null frames to pause the picture and audio. This enables higher priority streams to be serviced with no disruption, and lower priority streams to be serviced with graduated levels of disruption.

In another embodiment, there is no constraint that the active stream server stop streaming before sending the startPlay message 158 to the superseding stream server. If the latency characteristics of the network and messaging systems within the stream servers are known, the active stream server can time stopping of the stream such that the latency between actually stopping the stream, and starting the stream by the superseding stream server is near zero. In this scenario the sequence of events for the active stream server is: a) send startPlay to superseding stream server; b) wait some deterministic bounded time that is shorter than the total end-to-end latency for processing of the message; and c) stop streaming after bounded time expires. The sequence of events for the superseding stream server is the same in either scenario. When the superseding stream server receives the startPlay message it immediately starts streaming at the structural offset identified in the message. In another embodiment, the readyToPlay message may be forwarded from the superseding stream server to the active stream server indirectly via the stream control module.

In another embodiment, no restriction is made as to delays that can be added or removed in the timing of sending the readyToPlay message 158. For example, the superseding stream server can delay the sending of the readyToPlay message until higher priority streams are first processed. In another embodiment, in a resource constrained case, the superseding stream server can send a readyToPlay message before it is ready to stream the digital video content and if the stream is still not yet ready after receiving a startPlay message, it can stream null frames to pause the picture and audio. This enables higher priority streams to be serviced with no disruption, and lower priority streams to be serviced with graduated levels of disruption.

Although certain exemplary messages are described herein, no constraint is to be inferred as to how the messages are structured or communicated between servers. For example, any protocol and retransmission and acknowledgement scheme can be used. Also, no constraint is made as to the number of concurrent streams that can be signaled within a single message. That is, the messaging protocol can contain signaling for more than one stream.

The above-identified techniques enable a variety of techniques for balancing the handoff of streams from the active stream server to the superseding stream server and allow the handoff between stream servers to work in both lightly loaded and heavily loaded resource scenarios.

Both of the above-described techniques utilize a map of the stream structure (e.g., I/P/B frames or equivalent), which is known by both the active and superseding servers. In an embodiment, a map of the stream structure is computed at the time of ingest of the stream. The mapping, or metadata related to the mapping, is stored in a logical database or file associated with each stream server. Another technique involves dynamically computing stream structure within both the active and superseding stream servers. Other techniques can be used to compute, learn, and communicate the stream structure.

The above-described techniques make reference to identifying the point for stopping and starting a stream relative to a transition identifier that identifies a specific I, B, or P-frame. The transition identifier may use other information to identify the transition point in a sequence of digital video content. Other information that can be used for the transition identifier includes, for example, a time identifier (relative or absolute) or a bit/byte offset. Additionally, in the case of a transmission transport protocol that contains sequence numbers, e.g., Real-time Transport Protocol (RTP), the transition point can be identified as a sequence number or equivalent.

To implement resiliency of the control function, the above-described techniques utilize not only an active stream control server running the stream control module, but also both backup and potential backup stream control servers. The active stream control server sends state change messages to all backup stream control servers. Each server providing backup stream control functionality processes the messages in order to track stream state for each and every stream, but takes no action with respect to the stream itself.

If an active stream control server fails, one of the backup stream control servers is elected to become the active stream control server. Detection of failure can be accomplished using representative mechanisms such as generation and detection of heartbeat multicast messages.

If the number of backup stream control servers drops below some threshold (configured or dynamically determined), other servers can become backup stream control servers. Those servers have not been tracking message flow, and so in this case the state machines of all active sessions are sent by either a backup stream control server or the active stream control server to the new backup control server. Subsequent session state transitions are tracked by sending copies of all state machine messages to the new backup stream control server as above.

Figure 5:
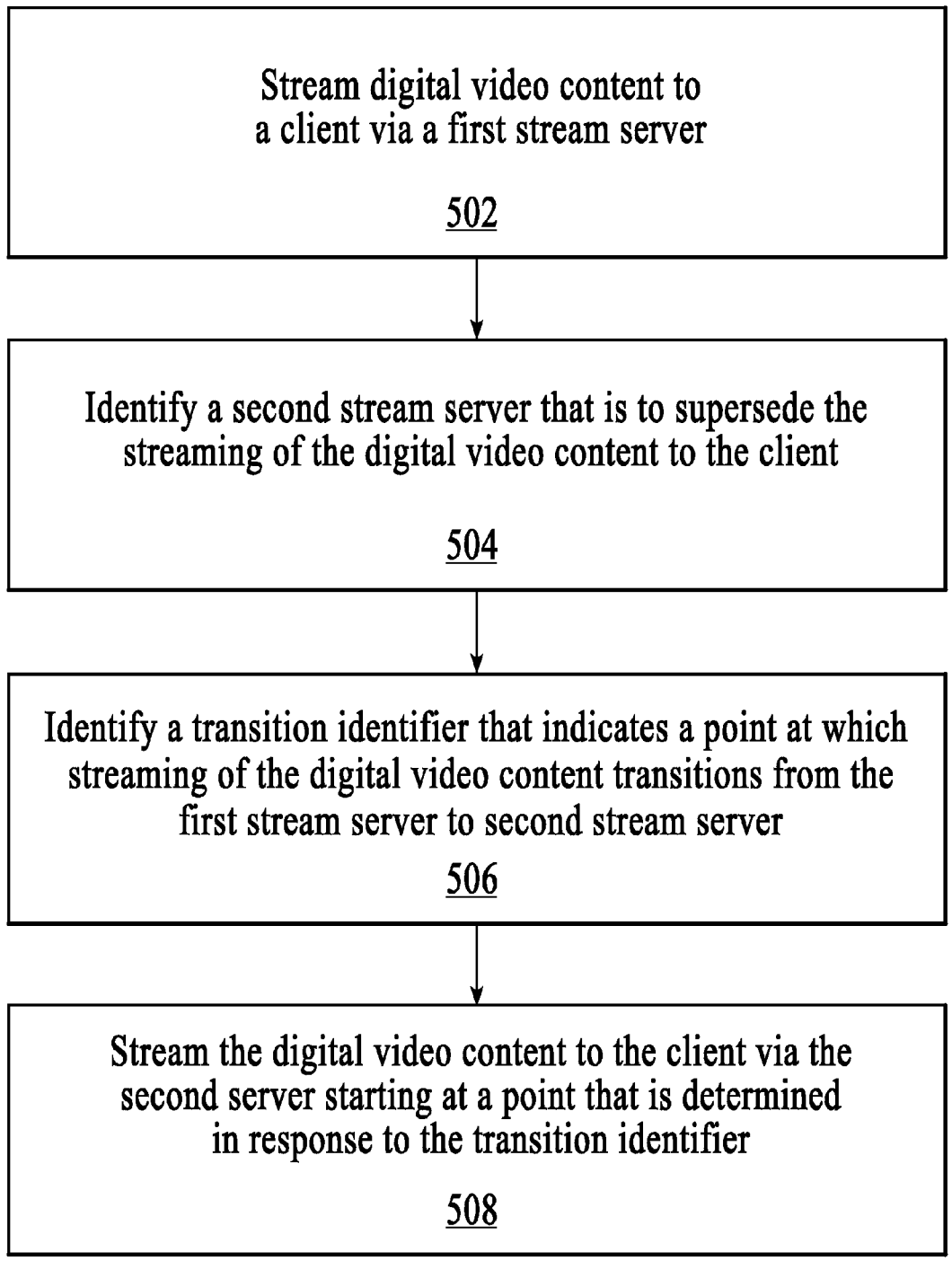
FIG. 5 is a process flow diagram of a method for transitioning streamed digital video content between stream servers.

FIG. 5 is a process flow diagram of a method for transitioning streamed digital video content between stream servers. At block 502, digital video content is streamed to a client via a first stream server. At block 504, a second stream server that is to supersede the streaming of the digital video content to the client is identified. At block 506, a transition identifier that indicates a point at which streaming of the digital video content transitions from the first stream server to the second stream server is identified. At block 508, the digital video content is streamed to the client via the second stream server starting at a point that is determined in response to the transition identifier.

As used herein, "real-time playout" means that the digital video content is played out from the client 110 instantly or nearly instantly after it is received at the client. For example, a client may buffer a few frames of an incoming stream, but the frames are played out after only a short buffer period. An exemplary playout delay may be on the order of tens of milliseconds, although other schemes may have a delay on the order of, for example, hundreds or thousands of milliseconds.

As used herein, the terms "multicast" and "multicasting" refer to a technique for providing the same digital video content to multiple clients concurrently in which the digital video content is delivered over common links only once (e.g., the digital video content is copied when it reaches nodes with links to multiple destinations). As used herein, multicast and multicasting are synonymous with the terms broadcast and broadcasting as related to, for example, hybrid fiber coaxial (HFC) cable networks. As used herein, the terms "unicast" and "unicasting" refer to a technique for providing digital video content to a single specified client.

In some applications, the network for distributing digital video content is a packet-based network. In packet-based networks, multicasting may involve replicating packets at nodes that include multiple branches leading to different clients. The replication of packets at branching nodes eliminates the need to send multiple packets of the same content over the same link. Packet-based distribution networks may utilize, for example, Internet Protocol (IP), Ethernet, asynchronous transfer mode (ATM), or a combination thereof to communicate digital video content. In packet-based networks, unicasting typically involves point-to-point messaging between nodes (e.g., servers and clients). Point-to-point messaging can be accomplished, for example, using well-known source/destination address based protocols (e.g., IP or Ethernet).

In some applications, the network for distributing digital video content includes an HFC network that utilizes radio frequency signals (RF) for local distribution of digital video content to the clients. In HFC networks, multicasting typically involves distributing all channels to all clients. Each client is able to receive any channel by tuning to the desired channel. In HFC networks, unicasting may involve distributing a channel, which is intended for only one client, to multiple clients and coordinating with the intended client so that only the intended client receives the desired channel. Even though the channel may be distributed to multiple clients, only one client, the intended client, is able to access the channel and display the digital video content. For purposes of this description, a communications technique such as this, which can be implemented in HFC networks, is considered unicasting.

Although specific embodiments of the invention have been described and illustrated, the invention is not to be limited to the specific forms or arrangements of parts as described and illustrated herein. The invention is limited only by the claims.

What is claimed is:

1. A method for transitioning streamed digital video content between stream servers, the method comprising:
    streaming digital video content to a client via a first stream server, wherein the digital video content comprises a sequence of frames;
    identifying a second stream server that is to supersede the streaming of the digital video content to the client;
    identifying a transition identifier that indicates a point within the sequence f frames at which streaming of the digital video content transitions from the first stream server to the second stream server;
    streaming the digital video content to the client via the second stream server starting at the point within the sequence of frames that is determined in response to the transition identifier; and
    stopping the streaming of the digital video content to the client via the first stream server at the point within the sequence of frames that is determined in response to the transition identifier so that there is no redundant streaming, of a frame in the sequence of frames of the digital video content, to the client by the first and second stream servers;
    wherein the method further comprises implementing an unbounded-time handoff from the first stream server to the second stream server by:

sending a supersedingStopPlay message from a stream control module of a stream control server to the first stream server, the supersedingStopPlay message initiating a process of stopping the streaming of digital video content within the first stream server;
    in response to the supersedingStopPlay message, sending a playWillComplete message from the first stream server to the stream control module, the playWillComplete message acknowledging that a request to stop streaming has been received and the process of stopping the stream has begun;
    in response to the playWillComplete message, sending a supersedingPlay message from the stream control module to the second stream server, the superseding Play message initiating the process of readying the stream of digital video content for subsequent play;
    in response to the superseding Play message and when the second stream server is ready to initiate streaming of the digital video content, sending a readyToPlay message from the second stream server to the first stream server, the readyToPlay message indicating that the second stream server is ready to stream the digital video content; and
    in response to the readyToPlay message, sending a startPlay message from the first stream server to the second stream server, the startPlay message including the transition identifier and indicating that streaming of the digital video content is to start immediately at the second stream server.

2. The method of claim 1 wherein the transition identifier identifies a frame of the digital video content.

3. The method of claim 1 wherein the transition identifier identifies one of an I, B, or P frame of the digital video content.

4. The method of claim 1 wherein the transition identifier is a deterministic offset of a specific frame of the digital video content.

5. The method of claim 1 wherein the transition identifier identifies a time identifier.

6. The method of claim 1 wherein the transition identifier is identified in terms of a bit offset.

7. The method of claim 1 further comprising notifying the second stream server that it will be superseding the streaming of digital video content.

8. A system for transitioning streamed digital video content between stream servers, the system comprising:
    a first stream server;
    a second stream server;
    a stream control server configured to:
    control and track the states of digital video content streams that are streamed from multiple stream servers within a logical stream group of stream servers that includes at least the first and second stream servers;
    identify the second stream server as the stream server that is to supersede, from the first stream server, the streaming of digital video content to a client, wherein the digital video content comprises a sequence of frames; and
    initiate transition of streaming the digital video content from the first stream server to the second stream server, wherein the transition between stream servers occurs at a point within the sequence of frames of the digital video content that is identified via a transition identifier and wherein the transition includes starting streaming the digital video content from the second stream server and stopping streaming the digital video content from the first stream server at the point within the sequence of frames of the digital video content that is identified via the transition identifier so that there is no redundant streaming, of a frame in the sequence of frames of the digital video content, to the client by the first and second stream servers;

further comprising implementing an unbounded-time handoff from the first stream server to the second stream server by:

sending a supersedingStopPlay message from the stream control server to the first stream server, the supersedingStopPlay message initiating a process of stopping the streaming of digital video content within the first stream server;

in response to the supersedingStopPlay message, sending a playWillComplete message from the first stream server to the stream control server, the playWillComplete message acknowledging that a request to stop streaming has been received and the process of stopping the stream has begun;

in response to the playWillComplete message, sending a supersedingPlay message from the stream control server to the second stream server, the superseding Play message initiating the process of readying the stream of digital video content for subsequent play;

in response to the superseding Play message and when the second stream server is ready to initiate streaming of the digital video content, sending a readyToPlay message from the second stream server to the first stream server, the readyToPlay message indicating that the second stream server is ready to stream the digital video content; and in response to the readyToPlay message, sending a startPlay message from the first stream server to the second stream server, the startPlay message including the transition identifier and indicating that streaming of the digital video content is to start immediately at the second stream server.

9. The system of claim 8 wherein the stream control server is further configured to generate the transition identifier.

10. The system of claim 9 wherein the stream control server is further configured to communicate the transition identifier to the first stream server.

11. The system of claim 8, wherein the first stream server is configured to generate the transition identifier.

12. The system of claim 11 wherein the first stream server is configured to communicate the transition identifier to the stream control server and the stream control server is configured to communicate the transition identifier to the second stream server.

13. The system of claim 11 wherein the first stream server is configured to communicate the transition identifier directly to the second stream server.

14. The system of claim 8, wherein the second stream server is configured to generate a message indicating that the second stream server is ready to stream the digital video content.

15. The system of claim 14 wherein the second stream server is configured to communicate the message directly to the first stream server.

16. The system of claim 8 wherein the transition identifier identifies a frame of the digital video content.

17. The system of claim 8 wherein the transition identifier identifies a time identifier.

18. A method for transitioning streamed digital video content between stream servers, the method comprising:

streaming digital video content to a client via a first stream server, wherein the digital video content comprises a sequence of frames;

identifying a second stream server that is to supersede the streaming of the digital video content to the client;

identifying a transition identifier that indicates a frame within the sequence of frames of the digital video content at which streaming of the digital video content transitions from the first stream server to the second stream server; and streaming the digital video content to the client via the second stream server starting at a first frame within the sequence after the frame within the sequence that is indicated by the transition identifier; and stopping the streaming of the digital video content to the client via the first stream server at the point that is determined in response to the transition identifier so that there is no redundant streaming, of a frame in the sequence of frames of the digital video content, to the client by the first and second stream servers;

wherein the method further comprises implementing an unbounded-time handoff from the first stream server to the second stream server by:

sending a supersedingStopPlay message from a stream control module of a stream control server to the first stream server, the supersedingStopPlay message initiating a process of stopping the streaming of digital video content within the first stream server;

in response to the supersedingStopPlay message, sending a playWillComplete message from the first stream server to the stream control module, the playWillComplete message acknowledging that a request to stop streaming has been received and the process of stopping the stream has begun;

in response to the playWillComplete message, sending a supersedingPlay message from the stream control module to the second stream server, the superseding Play message identifying the first stream server as the active stream server, identifying the digital video content that is to be streamed, and initiating the process of readying the stream of digital video content for subsequent play;

in response to the superseding Play message and when the second stream server is ready to initiate streaming of the digital video content, sending a readyToPlay message from the second stream server to the first stream server, the readyToPlay message indicating that the second stream server is ready to stream the digital video content; and in response to the readyToPlay message, sending a startPlay message from the first stream server to the second stream server, the startPlay message including the transition identifier and indicating that streaming of the digital video content is to start immediately at the second stream server.

19. The method of claim 18 wherein the transition identifier identifies one of an I, B, or P frame of the digital video content.

20. The method of claim 1 wherein identifying a second stream server that is to supersede the streaming of the digital video content to the client comprises generating a cost of streaming the digital video content and identifying the second stream server in response to the cost.

\* \* \* \* \*